United States Patent
Marlow et al.

(10) Patent No.: US 9,172,680 B2
(45) Date of Patent: Oct. 27, 2015

(54) SYSTEMS AND METHODS FOR ENABLING SECURE MESSAGING, COMMAND, AND CONTROL OF REMOTE DEVICES, COMMUNICATED VIA A SHORT MESSAGE SERVICE OR OTHER MESSAGE ORIENTED COMMUNICATIONS MEDIUMS

(71) Applicant: PROTECTED MOBILITY, LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: PROTECTED MOBILITY, LLC, Rockville, MD (US)

( * ) Notice: Subject to any disclaimer, the term of this patent is extended or adjusted under 35 U.S.C. 154(b) by 181 days.

(21) Appl. No.: 13/671,026

(22) Filed: Nov. 7, 2012

(65) Prior Publication Data

US 2013/0282904 A1  Oct. 24, 2013

Related U.S. Application Data

(60) Provisional application No. 61/557,598, filed on Nov. 9, 2011.

(51) Int. Cl.
*G06F 15/16* (2006.01)
*H04L 29/06* (2006.01)
*H04W 12/08* (2009.01)
*H04L 29/08* (2006.01)
(Continued)

(52) U.S. Cl.
CPC .......... *H04L 63/04* (2013.01); *H04L 29/08072* (2013.01); *H04L 63/20* (2013.01); *H04W 4/14* (2013.01); *H04W 12/02* (2013.01); *H04W 12/08* (2013.01)

(58) Field of Classification Search
CPC .......................... H06L 29/08072; H04W 12/08
USPC .................. 709/203, 220, 217, 246; 711/166; 717/102
See application file for complete search history.

(56) References Cited

U.S. PATENT DOCUMENTS

| | | |
|---|---|---|
| 5,592,555 A | 1/1997 | Stewart |
| 6,125,281 A | 9/2000 | Wells et al. |

(Continued)

FOREIGN PATENT DOCUMENTS

WO  01/95558 A1  12/2001

OTHER PUBLICATIONS

Chapman, Mark T., "Hiding the Hidden: A Software System for Concealing Ciphertext as Innocuous Text," The University of Wisconsin-Milwaukee, 1998, Under the Supervision of Professor G. I. Davida, 83 pages.

(Continued)

*Primary Examiner* — Khanh Dinh
(74) *Attorney, Agent, or Firm* — Nixon & Vanderhye P.C.

(57) ABSTRACT

Given the rise in popularity of communicating personal, private, sensitive, or vital peer-to-peer or peer-to-group information over potentially insecure text messaging infrastructure, it would be desirable to provide a solution that enables the exchange of this type of information securely over at least one path via data and/or voice networks. Furthermore, it would be highly desirable to enable access to the secure exchange of information over the at least one path by a given entity, as well as other computer applications that the given entity may use.

7 Claims, 14 Drawing Sheets

(51) Int. Cl.
  *H04W 4/14* (2009.01)
  *H04W 12/02* (2009.01)

(56) References Cited

U.S. PATENT DOCUMENTS

| | | | |
|---|---|---|---|
| 6,356,937 | B1 | 3/2002 | Montville et al. |
| 7,076,657 | B2 | 7/2006 | Koukoulidis et al. |
| 7,424,615 | B1 | 9/2008 | Jalbert et al. |
| 7,702,898 | B2 | 4/2010 | Tan |
| 7,774,504 | B2 * | 8/2010 | Chene et al ................... 709/246 |
| 8,064,606 | B2 | 11/2011 | Schuba et al. |
| 8,386,800 | B2 | 2/2013 | Kocher et al. |
| 8,464,061 | B2 | 6/2013 | Bradley |
| 2002/0123967 | A1 | 9/2002 | Wang |
| 2002/0141591 | A1 | 10/2002 | Hawkes et al. |
| 2003/0078058 | A1 | 4/2003 | Vatanen et al. |
| 2004/0171369 | A1 | 9/2004 | Little et al. |
| 2005/0081054 | A1 | 4/2005 | Choo |
| 2005/0232422 | A1 | 10/2005 | Lin et al. |
| 2006/0158460 | A1 | 7/2006 | Uh |
| 2006/0161646 | A1 * | 7/2006 | Chene et al. ................. 709/223 |
| 2006/0246956 | A1 | 11/2006 | Park et al. |
| 2007/0022295 | A1 | 1/2007 | Little et al. |
| 2007/0072564 | A1 | 3/2007 | Adams |
| 2007/0083766 | A1 | 4/2007 | Farnham et al. |
| 2007/0180230 | A1 | 8/2007 | Cortez |
| 2007/0180540 | A1 * | 8/2007 | Little et al. ...................... 726/34 |
| 2007/0185815 | A1 | 8/2007 | Boccon-Gibod et al. |
| 2008/0172730 | A1 | 7/2008 | Sandhu et al. |
| 2008/0313458 | A1 | 12/2008 | Fascenda et al. |
| 2009/0055643 | A1 | 2/2009 | Brown et al. |
| 2009/0169013 | A1 | 7/2009 | Fascenda et al. |
| 2009/0185677 | A1 | 7/2009 | Bugbee |
| 2009/0228707 | A1 | 9/2009 | Linsky |
| 2009/0265552 | A1 | 10/2009 | Moshir et al. |
| 2009/0268902 | A1 | 10/2009 | Fascenda et al. |
| 2009/0287930 | A1 * | 11/2009 | Nagaraja ....................... 713/171 |
| 2010/0020972 | A1 | 1/2010 | Baugher et al. |
| 2010/0159962 | A1 | 6/2010 | Cai et al. |
| 2011/0117883 | A1 | 5/2011 | Drabo |
| 2011/0138170 | A1 | 6/2011 | Fascenda et al. |
| 2011/0138172 | A1 | 6/2011 | McCreight et al. |
| 2011/0194695 | A1 | 8/2011 | Fascenda et al. |
| 2011/0225417 | A1 | 9/2011 | Maharajh et al. |
| 2012/0054493 | A1 | 3/2012 | Bradley |
| 2012/0239417 | A1 | 9/2012 | Pourfallah et al. |
| 2012/0239560 | A1 | 9/2012 | Pourfallah et al. |
| 2012/0290809 | A1 * | 11/2012 | Little et al. .................... 711/166 |
| 2012/0300932 | A1 * | 11/2012 | Cambridge et al. .......... 380/270 |
| 2012/0308001 | A1 | 12/2012 | Arnold et al. |
| 2013/0030828 | A1 | 1/2013 | Pourfallah et al. |
| 2013/0268437 | A1 * | 10/2013 | Desai et al. ..................... 705/41 |

OTHER PUBLICATIONS

Lisonek, David, et al., "SMS Encryption for Mobile Communication," 2008 International Conference on Security Technology, IEEE Computer Society, Dec. 2008, SecTech.2008.48, pp. 198-201.

Office Action dated Jan. 16, 2015, issued in U.S. Appl. No. 13/947,186.

* cited by examiner

FIG. 3

Users

| ▲ Name | Phone Number | Email Address | Devices | Groups | Pending Commands | Last Command | Time |
|---|---|---|---|---|---|---|---|
| Mary Beagan | 1-588-222-1212 | mary@protected.com | 1 | 1 | 0 | Disable Pin | 09/07/2011 08:05 AM |
| Mary Smith | 7328908156 | mary@company.com | 1 | 1 | 0 | Send Message | 09/19/2011 09:47 AM |

FIG. 4

Groups

| Name | Created On | Created By | Members |
|---|---|---|---|
| Development | 09/08/2011 07:34 PM | Huda Mann | 2 |
| Marketing Team | 08/21/2011 08:47 PM | Administrator | 1 |
| OPS Team 1 | 08/25/2011 11:10 AM | Huda Mann | 1 |
| Sales Team | 05/21/2011 08:47 PM | Administrator | 3 |

FIG. 5 protectedmobility™

| Dashboard | Users | Groups | Devices | Reporting | Admin |

Logged in as Huda Mann | LOG OUT

Devices

Search [          ] [Q Search]

| ◆ Device | Device Model | Device Type | Carrier | Last Command | Last Command On | Last Command By |
|---|---|---|---|---|---|---|
| Mary Beegan - Motorola (primary) | Milestone | Android | AT&T | Disable Pin | 09/05/2011 10:43 PM | Huda Mann |
| Mary Smith - Blackberry | bold | Blackberry | T-Mobile | Send Message | 09/18/2011 09:47 PM | Huda Mann |

SYSTEMS AND METHODS FOR ENABLING SECURE MESSAGING, COMMAND, AND CONTROL OF REMOTE DEVICES, COMMUNICATED VIA A SHORT MESSAGE SERVICE OR OTHER MESSAGE ORIENTED COMMUNICATIONS MEDIUMS

CROSS-REFERENCES TO RELATED APPLICATIONS

This application claims the benefit of the following applications which are also incorporated herein by reference as if expressly set forth:

U.S. Provisional Patent Application No. 61/557,598 filed Nov. 9, 2011 entitled "Systems And Methods For Enabling Secure Messaging, Command, And Control Of Remote Devices, Communicated Via A Short Message Service Or Other Message Oriented Communications Mediums";

U.S. Provisional Patent Application No. 61/556,635 filed Nov. 7, 2011 entitled "Secure Messaging" and counterpart nonprovisional application Ser. No. 13/670,925 filed concurrently herewith;

U.S. Provisional Patent Application No. 61/556,652 filed Nov. 7, 2011 entitled "Systems And Methods Using One Time Pads During The Exchange Of Cryptographic Material" and counterpart non-provisional application Ser. No. 13/670,994 , now U.S. Pat. No. 8,924,706 issued Dec. 30, 2014, filed concurrently herewith, U.S. patent application Ser. No. 12/940,213 filed Nov. 5, 2010;

U.S. Provisional Patent Application No. 61/351,979 filed Jun. 7, 2010.

STATEMENT REGARDING FEDERALLY SPONSORED RESEARCH OR DEVELOPMENT

N/A

FIELD

The technology herein relates to message security, and more particularly to secure exchange of message oriented and/or command and control data between at least one server class system e.g. utilized by an organization and at least one peer system over potentially diverse communications paths. The technology herein further relates to a server class system that can also act as a gateway for other applications to exchange secure messages with at least one peer system.

BACKGROUND AND SUMMARY

Today, a significant amount of information is communicated via the Short Message Service (SMS) infrastructure that is provided by mobile phone carriers worldwide. Other message oriented communications paths also exist, such as Twitter, and Google Groups. This type of communications has become widely popular over traditional voice conversations because it offers the participants some semblance of privacy in a room. No longer can an individual just eavesdrop on at least part of a conversation. In this simple case, an interloper needs to be close enough to be able to read the screen of the communicating device.

While a naive user may believe that text conversations are private, in fact some nefarious party can easily purchase technology over the Internet or elsewhere that allows him to monitor the communications exchange. Thus, no real security exists in the vast majority of modern text messaging. An attacker can easily intercept and read the texts you send to your friends, your family, your business colleagues and others.

Even with the inherent security risks, many entities who ought to be concerned about security and secrecy have embraced the technology due to the immediacy of the communications. Doctors and nurses may use the technology to exchange patient information, even though this type of information is required by law to be secured. Financial institutions often send updates to their customers about their account balances, transactions, trades, etc., that could easily be intercepted by malicious parties. Other use cases abound.

Some shy away from using these communications paths due to the insecurity, but these vital and resilient communication channels have proven useful during times when other paths such as traditional voice and data networks are either overloaded or inaccessible, especially during natural or unanticipated disasters. During these occurrences, it has been well documented, even by the US government that:

"because wireless networks may be congested during an emergency, sending a text message may work better than placing a voice call." (http://www.fcc.gov/guides/emergency-communications)

Consider government officials who need to exchange secure but potentially unclassified information. Other critical infrastructure such as a country's energy grid, sensors, or other machine to machine (M2M) communications provide for command and control of the equipment. Individuals with mal-intent could easily create havoc during the exchange of information in these scenarios.

Thus, with the proliferation of mobile, portable, or other remote computing devices being utilized in day-to-day communications, retaining secure access with these devices is of paramount importance. Prior art is filed with examples of how to provide for secure communications with these devices over traditional data interconnects such as IP based networks, virtual private networks, transport layer security, etc.

However, many of these mediums are bandwidth constrained. Trying to layer traditional methods of securing communications onto these environments may prove fruitless as well as potentially exacerbate an already difficult situation. Therefore, it would be highly desirable to provide a lightweight solution that enables secure access to and communications with these computing devices over message oriented channels as an alternative.

Furthermore, many systems today are unable to participate in any correspondence via this technology, or are saddled with additional overhead when communicating information to peer systems through some existing gateway infrastructure.

The exemplary illustrative non-limiting technology herein addresses these needs in a multitude of ways. Exemplary illustrative non-limiting technology herein thus provides methods and systems provided by a server based computing system utilized by an organization or entity to communicate securely with mobile, portable, or other embedded systems via message oriented communications facilities.

An example non-limiting Protected Mobility Enterprise Console (PMEC) allows an organization or entity to utilize these alternate communications paths through a provided console interface and/or via exposed web services that other applications can use to send and receive potentially private information. The exemplary illustrative non-limiting technology herein provides, among other things, security of communications between the PMEC and collaborating devices.

To enable secure exchange of message oriented communications and maintain access to cooperating devices, services such as those provided by a protected mobility enterprise console (PMEC) can be utilized. In one exemplary illustrative non-limiting arrangement, the PMEC is an application that can be installed by a given organization on a generic computer based platform, or provided as a hosted/managed service for a given entity. Its illustrative non-limiting core functionality allows individuals, operators, or other applications to securely exchange sometimes critical information with other devices that are within its domain. The exchange of information can be accomplished over Internet related protocols such as HTTP, alternatively through messaging services that provide gateway services to wireless network short messaging services, or directly through interconnects with communication carriers.

Enabling more than one communications path to potentially critical infrastructure or personnel via the cooperating computing devices provides for resiliency of information flow and in some cases helps maintain business continuity. First responders, governments, military, may also find these services useful.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 2 is a non-limiting sample web page or other display used to input operator/administrator credentials to access/configure PMEC functionality.

FIG. 4 is a non-limiting sample web page or other display used to display information about a particular user associated with the PMEC.

FIG. 5 is a non-limiting sample web page or other display used to display information about groups of users associated with the PMEC.

FIG. 6 is a non-limiting sample web page or other display used to display information about groups of users/devices associated with the PMEC.

FIG. 7 is a non-limiting sample web page or other display used to display reporting information about the state of different commands/message oriented communications exchanged with a particular group, user or device.

FIG. 8 is a non-limiting sample web page or other display used to display information about administrators and operators, as well as an audit of the functions/communication that have been requested by the person and which also allows the additional/deletion of administrators/operators.

FIG. 9 is a non-limiting sample web page or other display used to allow entry and display of configuration and system parameters used in the exemplary non-limiting operation of the application.

FIG. 10 is a non-limiting sample web page or other display used to allow the addition/deletion as well as display of the different exemplary device types that the system is in communications with.

FIG. 11 is a non-limiting sample web page or other display used to allow the addition/deletion as well as the display of different communications carriers the system ultimately may use to communicate with the exemplary devices.

FIGS. 12A and 12B are a non-limiting sample web page or other display used to allow entry of an illustrative message that will be subsequently sent to a selected user/device.

DETAILED DESCRIPTION

Figure 1:
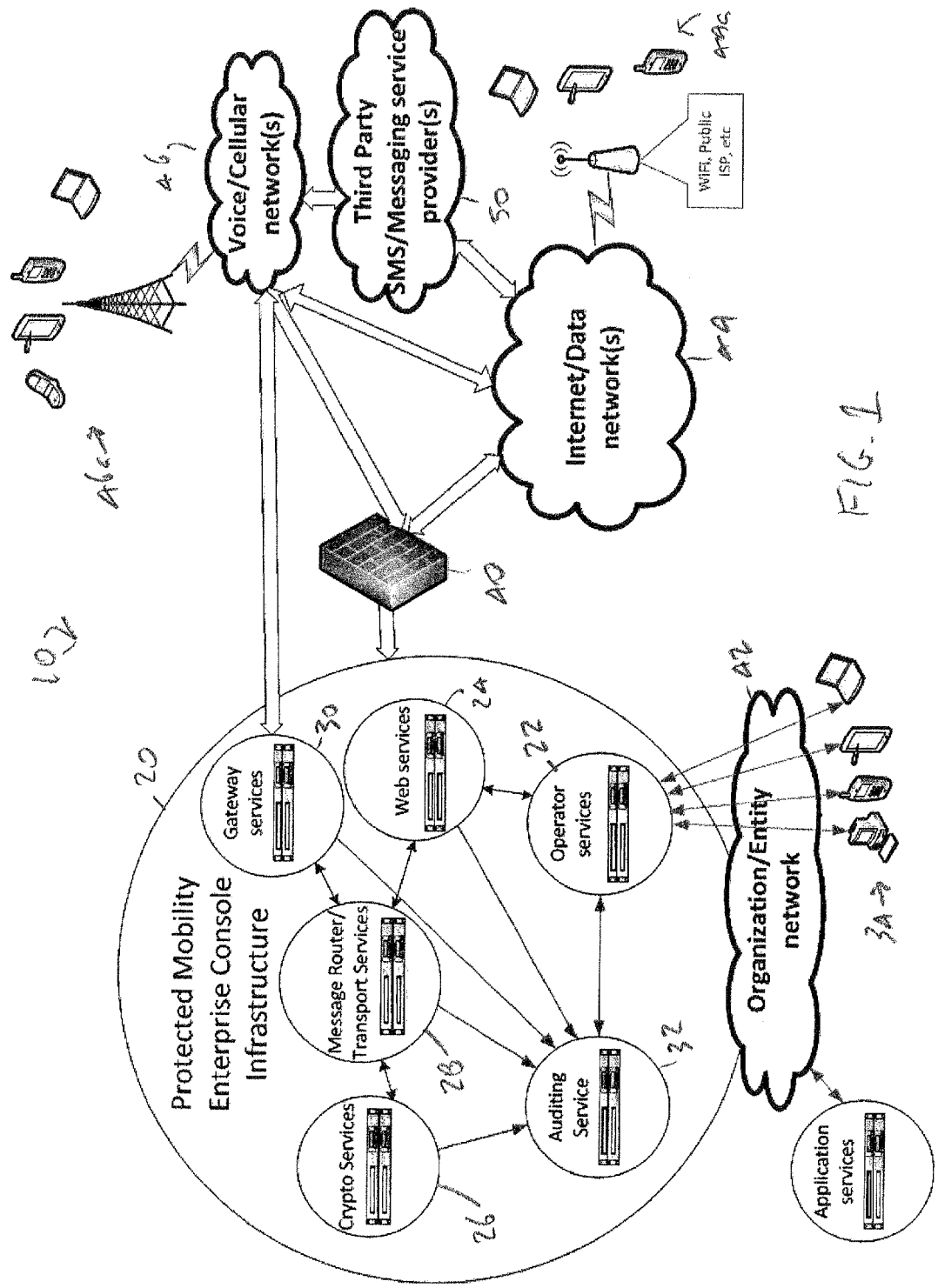
FIG. 1 is a block diagram of a non-limiting example illustrative PMEC based system.

Example Illustrative Protected Mobility Enterprise Console Application and Services FIG. 1 shows an example non-limiting schematic diagram of a system 10 including a Protected Mobility Enterprise Console (PMEC) 20. In the example shown, PMEC 20 is located behind the firewall 40 of an enterprise (e.g., organization or entity) and communicates with an organization/entity network 42. Computing devices 34 such as personal computers, laptop computers, smart phones, tablet computers and a variety of other devices can communicate via network 42 with PMEC 20 and vice versa. PMEC 20 can be located anywhere. If located in the cloud or provided by a managed service provider for the customer, PMEC 20 would be moved from inside the organizations network to the other side of the organization's firewall 40. PMEC services could then be securely access using any number of communications technologies such as VPNs, transport level security such as SSL/TLS, direct connection between the organizations and the cloud service providers network, etc.

As shown in FIG. 1, the example non-limiting PMEC 20 is logically architected into separate functional areas or modules, each providing separate capabilities that may be geographically/physically dispersed to enable the system to scale. They are for example:
  Operator/Administrator interface (22)
  Web service interface (24)
  Cryptographic interface (26)
  Message Router/transport interface (28)
  Gateway interfaces (30)
  Auditing/reporting interface (32).

In the example shown, PMEC 20 interacts with a variety of devices that may connect to it from the Internet or other data network(s) and/or from voice/cellular network(s) 46. For example, PMEC 20 can securely or insecurely interact with cellular capable devices 46a such as smart phones, cellular telephones, tablet computers, laptop computers and the like that communicate using GSM, LTE or other cellular wireless protocols. PMEC 20 can also interact securely or insecurely with WiFi or other networked devices 44a such as laptop computers, tablet computers, smartphones, etc. that interconnect with the internet/data network(s) 44. It is also compatible with third party SMS/messaging service provider(s) 50 that in turn may interconnect with the voice/cellular network(s) 46 and the Internet/data network(s) 44.

Figure 1A:
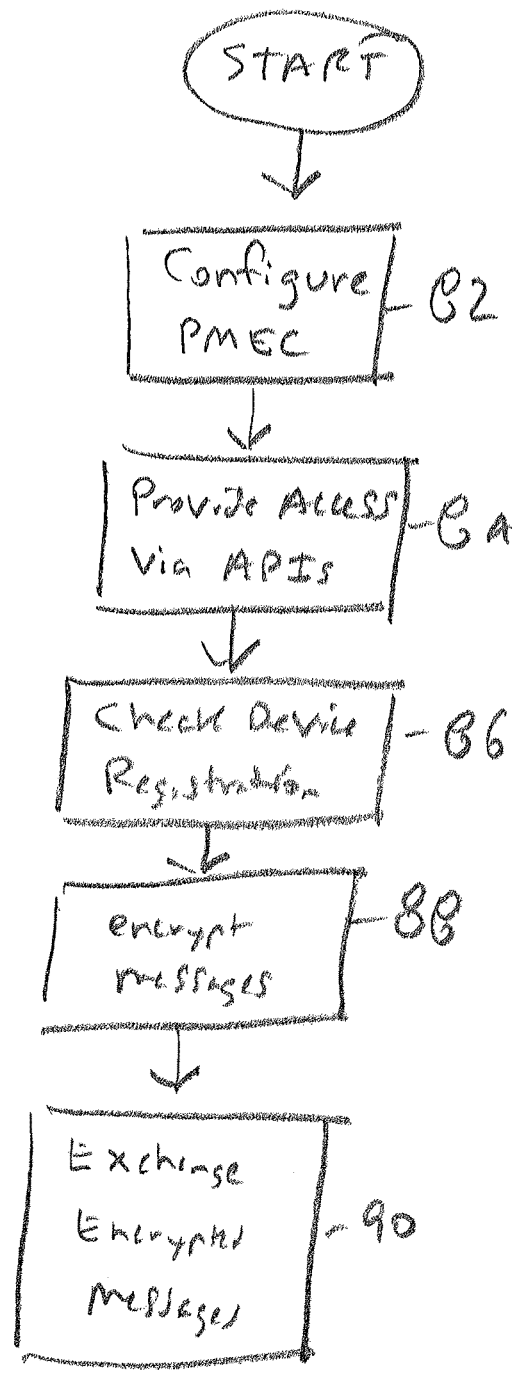
FIG. 1A is an example illustrative flowchart of program control steps stored in a non-transitory storage medium and executed by the example illustrative PMEC.

After installation, Operators/Administrators use the operators services 22 interface to configure/manage the PMEC 20 application (FIG. 1A, block 82). The operator services 22 may employ a database service to hold configuration, policy, and/or key information, or this information can be inputted on demand, or both. Communications with at least one cooperating device can also be instantiated through this interface as it uses the facilities of the other provided services 24-32 to complete the task After configuration, and access to the web service interface 24 is enabled, other applications can now interact with the exposed API via standard protocols such as HTTP(s) or other common remote procedure call mechanism that may be used for inter-process communications (FIG. 1A, block 84). The API allows other applications to exchange message-oriented communications, including but not limited to, locating a device, sending information, (de)registering devices, etc., with the at least one device that is within the PMEC's domain.

Whether the message oriented communications is generated via the Web user interface 24, or through communications via the Web services interface, for secure messaging the PMEC 20 may use its cryptographic service interface 26 to secure the message if the at least one device is registered within the PMEC's domain (FIG. 1A, block 86, 88). Given the appropriate cryptographic material, the cryptographic services interface 26 will appropriately cipher the message and return it for further processing by the PMEC 20.

While PMEC 20 can send and receive secure messages, sending/receiving non secure messages is also possible (i.e. FIG. 1A). Clearly this would be the case if the PMEC 20 did not have an associated public keys for a device. However, in the example non-limiting implementation, an operator/application may also choose to send a clear text message. If the application/operator chooses to send a secure message, and an associated public key is not known by the PMEC, an error can be returned.

Assuming no error has occurred, once the message has been processed by the cryptographic service interface, the PMEC's message router 28 is then handed the message to correctly exchange the communiqué with its intended target(s) (FIG. 1A, block 88). If the message is outbound, the message is handed off to PMEC gateway service 50 for ultimate distribution via the at least one message gateway service such as etherSMS™. If the information is inbound, the message is then handed off to either the Web User interface service 24 and/or the Web Services interface for consumption by the Administrator/operator, an external application in communications with the Web Service API, or both.

If the message router 28 determines that the message is destined for at least one of the devices that is within the PMEC's domain, based on policy and configuration, the service will then forward the communiqué via the at least one of the configured messaging channel (FIG. 1A, block 90). The messaging channel interconnects can be Internet based service such as etherSMS™, Skype, Twitter, to a wireless carrier's network 46, other, etc. Alternate paths for the communications to occur can be easily envisioned by those skilled in the art.

In one example non-limiting configuration, the PMEC 20 in conjunction with a cooperating computer application such as ProtectedSMS, as defined in co-pending patent application No. 61/556,635 filed Nov. 7, 2011 entitled "Secure Messaging", enables message-oriented communications to be exchanged with various ones of such devices in a secure manner. By using the defined lightweight Contact Registration Exchange as described in co-pending application co-pending patent application No. 61/556,635 filed Nov. 7, 2011 entitled "Secure Messaging" the PMEC can establish a database of public key(s) for devices in within its domain.

Figure 12B:
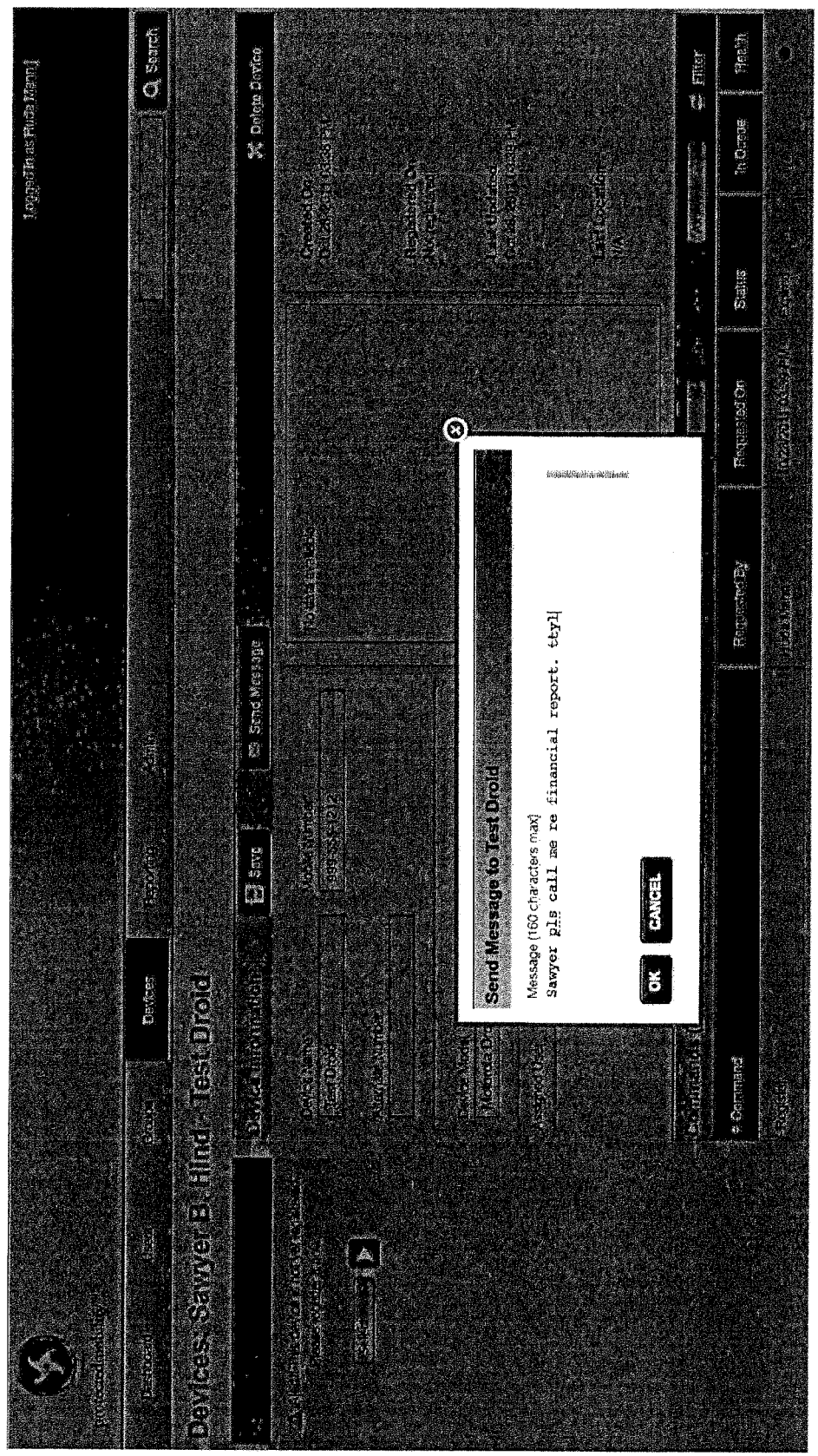

Assuming secure messaging is desired, once the public keys are exchanged via the mechanisms outlined in patent application No. 61/556,635 filed Nov. 7, 2011 entitled "Secure Messaging" between the at least one target device and a PMEC (e.g. registered), message-oriented communications can be sent or received securely. In one exemplary embodiment illustrated in FIGS. 12A and 12B, the PMEC 20 is able to send a number of different command and control messages to the at least one collaborative device.

In this non-limiting example, the PMEC 20 can initiate a command to the device such as to:
Unregister or deregister
Reset Pin
Locate
Wipe Data
Disable Pin
other
along with sending and/or receiving secure text messages as illustrated by FIG. 12.

Additional services can be provided. For example, there may be a need to send the same information to multiple recipients, such as a "locate" command. In one example scenario, a team of first responders are in the field handling a situation. A commander may need to determine the location of his/her team members. As indicated in FIG. 5, an administrator can easily define groups of users and/or devices. By simply selecting the group via the non-limiting illustrative web user interface, an operator can send a locate command/request to a plurality of devices that are associated with the selected group. As each request/response is processed, the operator of the PMEC 20 can view the status of each command. The location of each device may be reported back to the PMEC 20 as GPS or other location coordinates that could be easily displayed via existing mapping applications such as Google Maps. More sophisticated maps could be used to give in-building or three-dimensional displays of the location of each device.

Another advantage that can be realized via the group communications can also be enhanced by the PMEC 20 becoming the relay agent for multiparty communications. By the at least one device responding to a group text message, the PMEC 20 could replicate that information and send that to the other members of the group. This could potentially increase cost savings considering some current pricing models for message-oriented communications. In one illustrative example, many communications carriers charge a price for each message sent and each one received. Without the PMEC 20, it is possible in one scenario, that if one of at least a plurality of devices responds to a group message, and that the at least one device would have to send a message to each other participant of the group. Having the PMEC 20 involved would allow the initiating device to send the message once to the PMEC, and have the PMEC then replicate the message potentially reducing the cost of total number of messages communicated.

Figure 2A:
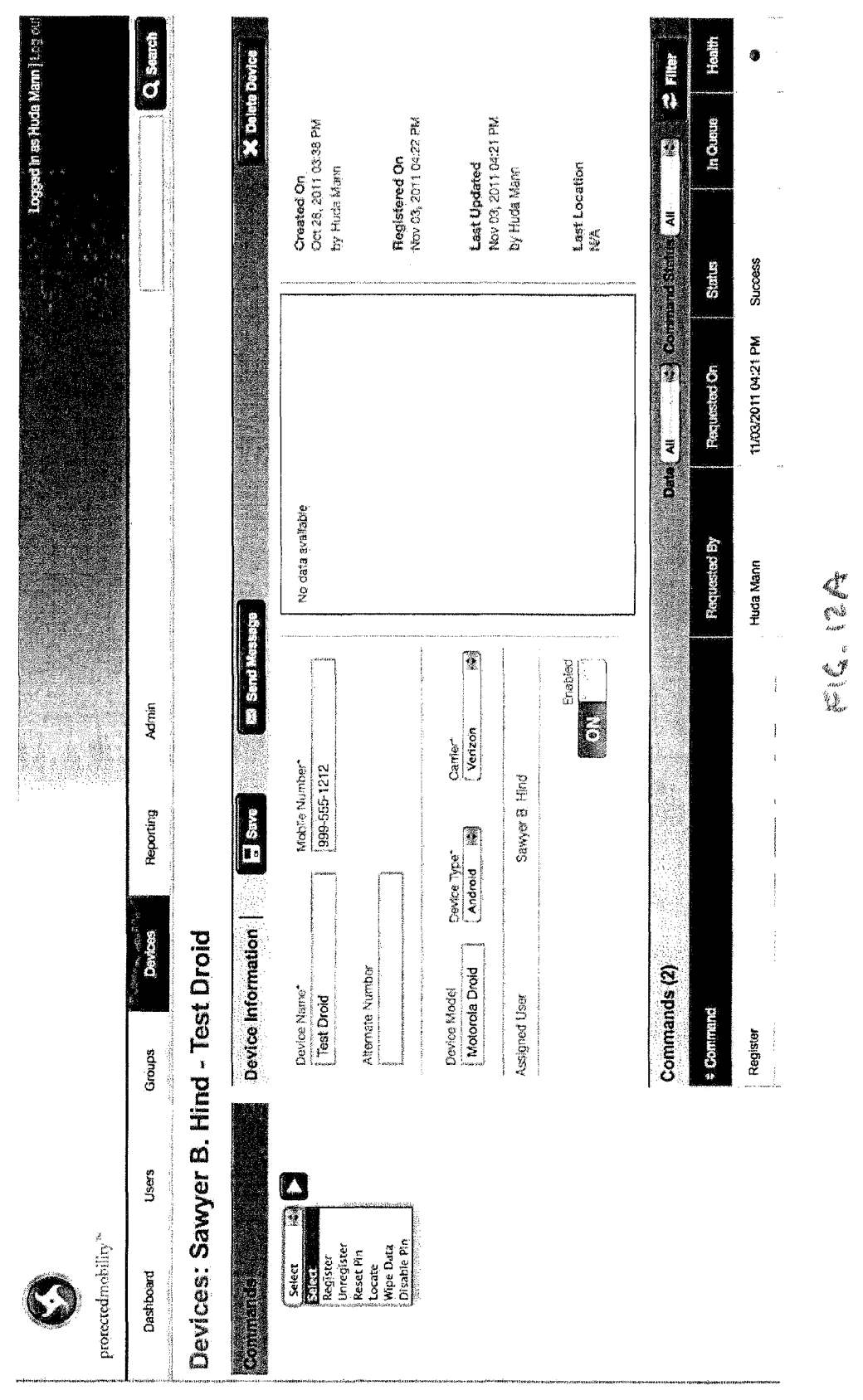

In one illustrative embodiment, each operator/administrator may log in via the web user interface to access the services available via the console. FIG. 2 is one non-limiting example of a login page. Here credential information is captured and validated against an entity's policy information to determine who, what, when, where, and how a particular operator/administrator may access the PMEC services. The credential information is also used to create an audit trail of the operator/administrator's actions.

Figure 3:
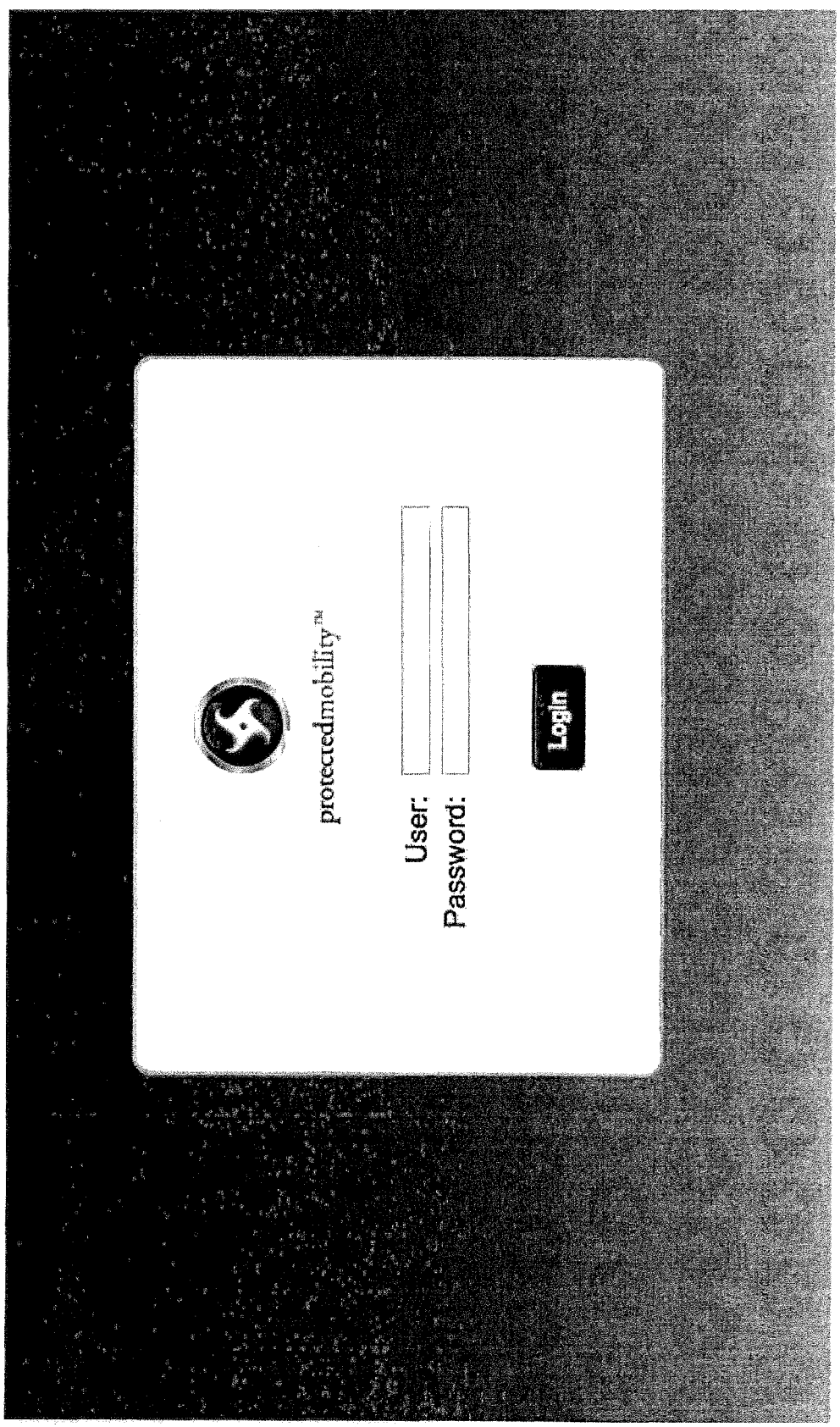
FIG. 3 is a non-limiting sample web page or other display used to provide the operator/administrator with a quick "dashboard" overview.

FIG. 3 is a non-limiting example of a landing page once a user's credentials have been verified. This "dashboard" may list information about the health and status of the system. However, based on the role of the individual, more or less information may be displayed. As an illustrative non-limiting example, a certain operator may have restricted access for information pertaining to certain groups. The operator may also be potentially restricted from registering new devices, reconfiguring system parameters, reviewing audit logs, etc.

FIG. 4 is a non-limiting example of a web page allowing an operator/administrator to enter/modify/delete information regarding users that are within the PMEC's domain. This information may be used to help an operator/administrator manage communications to an at least one device, depending on how an entity chooses to associated devices and users.

As described previously, in FIG. 5 the non-limiting illustrative embodiment allows for an authorized operator/administrator to create groups of devices or users. As depicted, these groups can be defined as a collection of users, devices, or both. This allows an entity to flexibly communicate or issue command and control message to individuals that may have more than one device. Alternatively, if the devices are headless, or have no user associated with it, the entity can easily communicate with a subset of devices within the PMEC's domain.

FIG. 6 is a non-limiting illustrative embodiment of a web page that allows an authorized operator/administrator to add/modify/delete devices within the PMEC's domain. Through this interface, information such as carrier, type of device, phone number/network identifier, etc. can be easily entered and recorded for subsequent use by the system.

FIG. 7 is a non-limiting illustrative embodiment of a web page that provides for an authorized operator/administrator to review system logs and audit trail. As indicated by the exemplary diagram, the information can be sorted, or filtered by any number of parameters such as operator/administrator name, command/message type, date range, etc., to limit the information displayed. Other sorting or reporting facilities can be easily envisioned by those schooled in the art.

Figure 8:
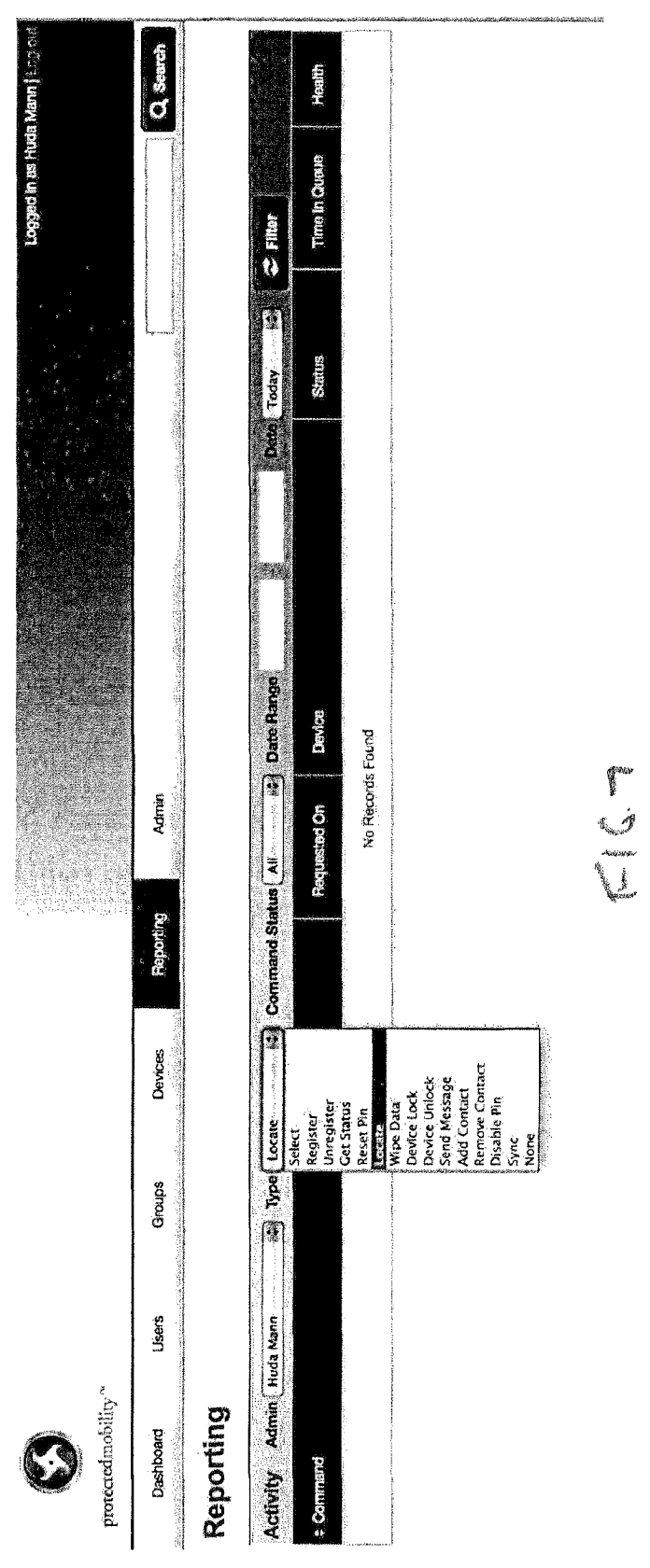
Figure 8:
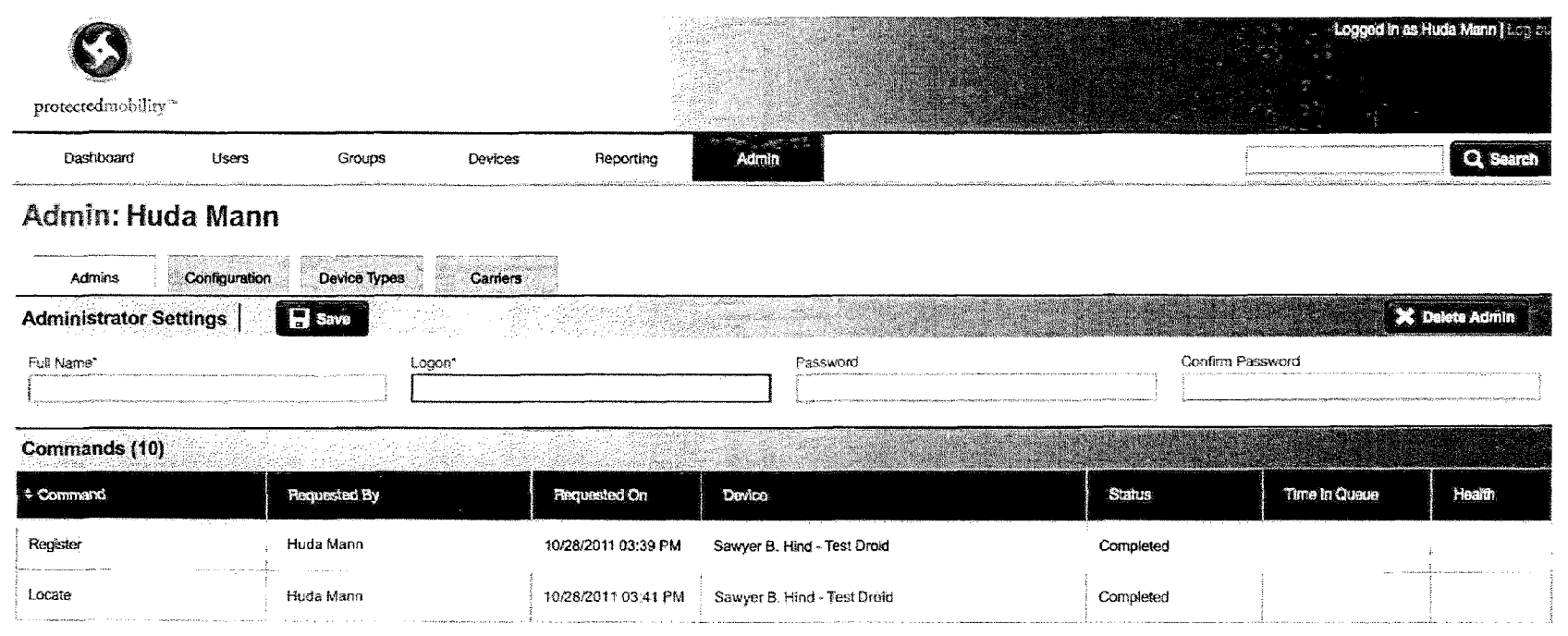

FIG. 8 is a non-limiting illustrative embodiment of a web page that allows an authorized user to add/delete/modify administrator/operators to the PMEC system. In some environments, certain privileges and rights can be assigned to each operator/administrator potentially limiting access to PMEC 20's functionality. Other information, including, but not limited to an audit trail of what operations a particular operator/administrator issued may also be displayed.

Figure 9:
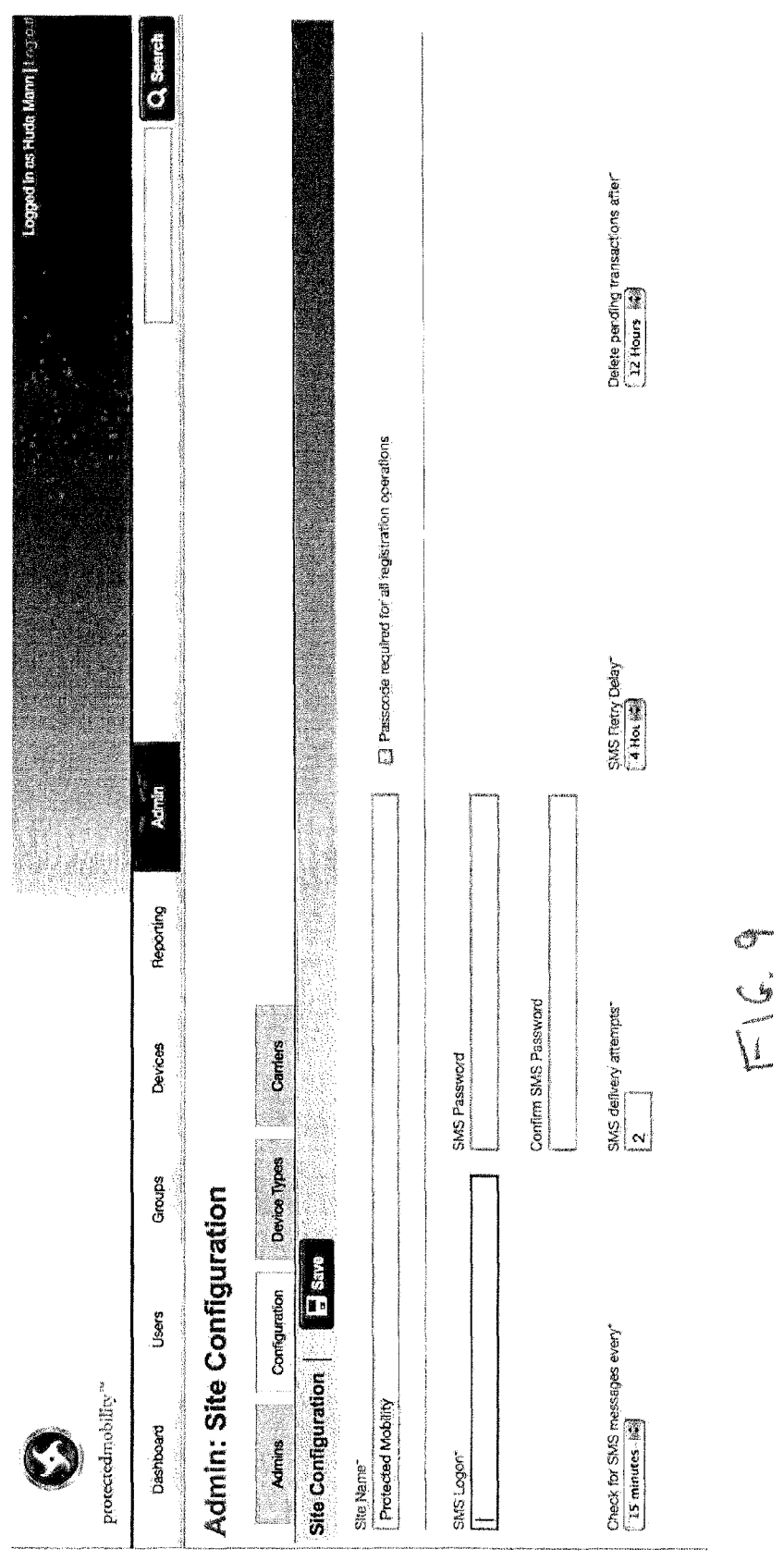

FIG. 9 is a non-limiting illustrative embodiment of a web page that allows an authorized administrator/operator to enter configuration for the PMEC system. Information that may be entered by the operator/administrator may be, but not limited to a specific site name, credential information for gateway services such as those provided by etherSMS™, polling interval (if any) for message-oriented communications, delivery attempts, retry timeouts, one time passcode requirements as defined by co-pending U.S. Provisional Patent Application No. 61/556,652 filed Nov. 7, 2011 entitled "Systems And Methods Using One Time Pads During The Exchange Of Cryptographic Material", etc. Other configuration and policy information can easily envisioned by those schooled in the art.

Figure 10:
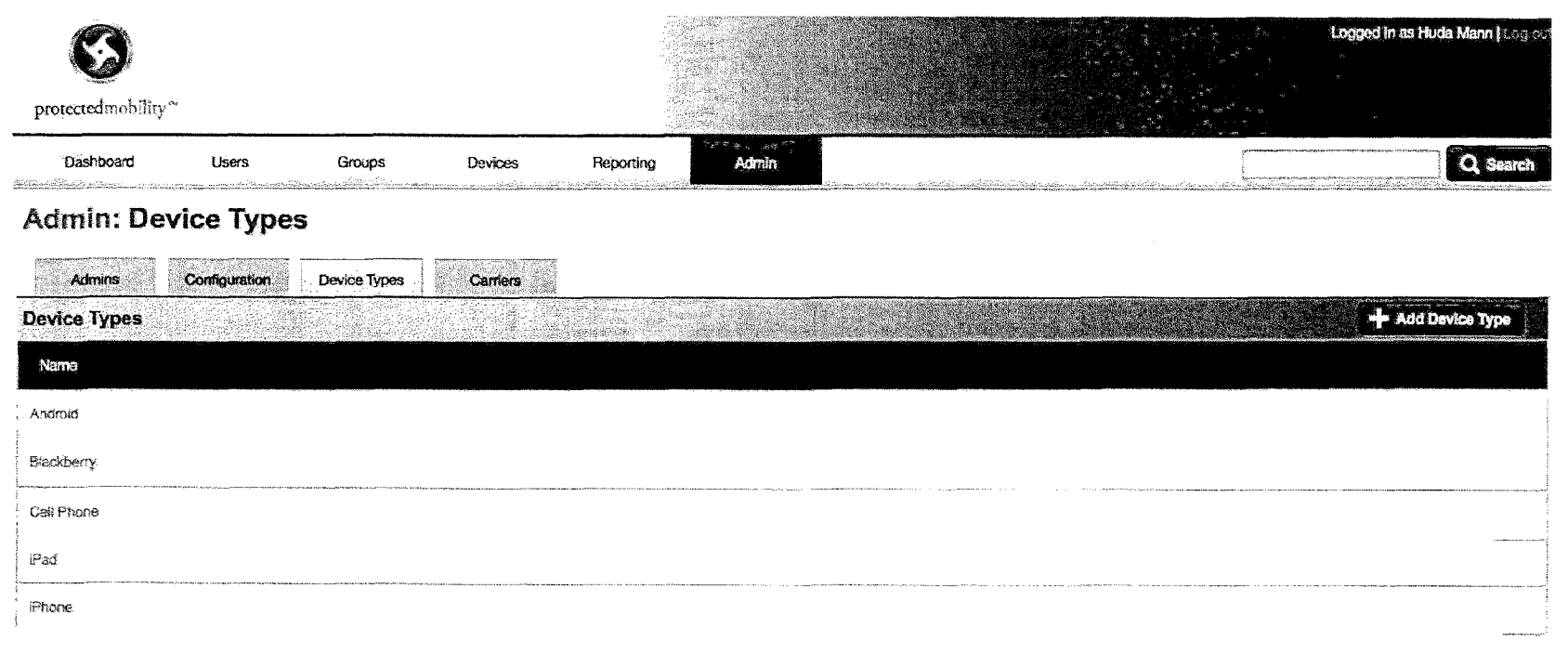
Figure 11:
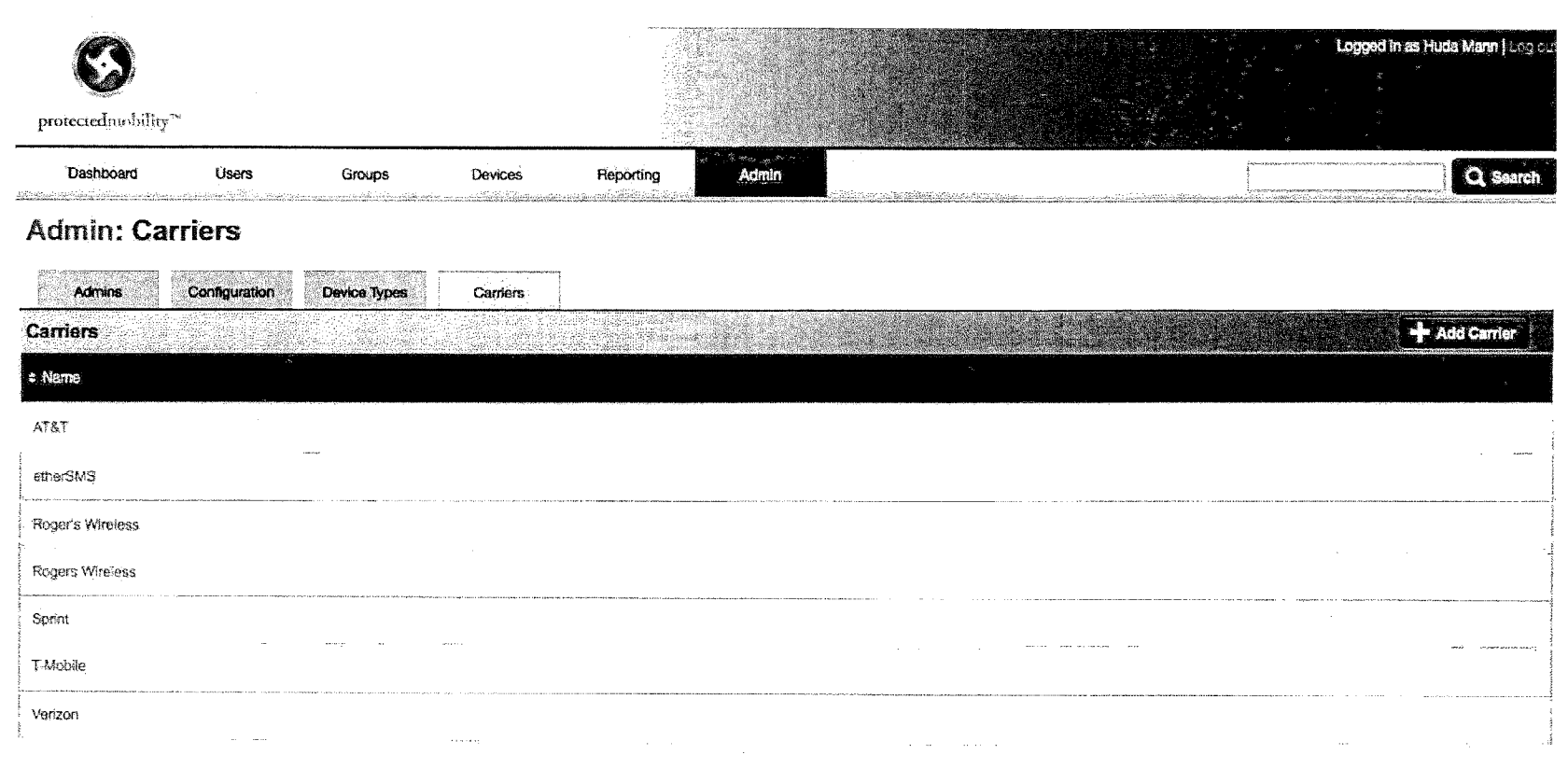

Similarly FIG. 10 and FIG. 11 is a non-limiting illustrative embodiment of web pages that enable an authorized operator/administrator to add/modify/delete device types and carriers that enable the authorized administrator/operator will used when defining user/device account/profile/configuration information. For instance, based on a specified carrier, configuration may include, but not limited to an email gateway information used for sending SMS information, what MMS URL to use, etc. Device type information may include, but not limited to, message limitations, any transcoding that may be necessary, what interface to used, such as etherSMS™ or cellular messaging services, etc. Other information can be easily envisioned by those schooled in the art.

Along with the operator/administrator interface, the PMEC exposes a number of API's that via a web services interface that other applications may use to exchange message-oriented and/or command and control information to and from devices within the PMEC's domain. This service can then be accessed by an entity's other applications including, but not limited to, Customer Relation Management (CRM), Machine-to-Machine (M2M) communications for infrastructure command and control, etc. If a device/user cryptographic credentials have been registered with the at least one PMEC, applications can communicate securely to the intended device(s) and/or user(s).

Example

Consider the following non-limiting usage scenario; a financial institution would like to send out alert information to at least one of their customers via message-oriented communications, due to the immediacy of the information. In many cases today, an institution may send an email, however, access can be cumbersome. The user may not be notified of the availability of the information as they may have to log onto a website to gain access to their email, etc., delaying the notification. Furthermore, the exchange may take multiple steps to provide the information to the intended party. Other impediments can be easily envisioned. Instead, by using the PMEC 20, the same financial application that generated the email can send an alert to the at least one customer via alternative message-oriented communication. This information can be delivered to the at least one customer's device in a secure manner. Through the web service API, the application can send the PMEC 20 via standard protocols such as Internet HTTP(s), the user/device identification information (e.g. name, phone number, network ID, etc.) along with the information to be sent. The PMEC 20 will then generate a secure message through its cryptographic services. Once complete, together with a companion product such as ProtectedSMS, as described in application U.S. Provisional Patent Application No. 61/556,635 filed ON Nov. 7, 2011 entitled "Secure Messaging"; that is installed on the at least one customer's device, the PMEC will then forward the secure message to the at least one customer's device via its message router service, sending the message via the at least one gateway service such as etherSMS™. Alternate paths may also be available and/or used in coincidence with communications that may consider least cost routing, etc. Because ProtectedSMS also allows for messages to require a read return receipt, the initiating application can then determine if the message being sent was at least received by the intended at least one customer device and the operator opened the message.

Alternatively, a similar scenario can be easily envisioned using the PMEC's group functionality to exchange message-oriented communications securely with a plurality of customers/devices.

The PMEC can also interface with additional gateway services such as those provided by etherSMS™ to enable communications via cellular wireless SMS channels or within the etherSMS™ network, via other Internet base messaging services (Twitter, Skype, Peep, etc.), or directly to cellular wireless carriers networks, based on its configuration and/or infrastructure available.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:
1. A system comprising at least one computer server for use by at least one organization or individual for facilitating secure short messaging to at least one other disparately-lo- cated computing device that is operatively coupled to at least one voice and/or computer data network, the system being configured to provide:

cryptographic services to secure short messages being communicated between the computer server and the at least one other disparately-located computing device, the cryptographic services being configured for encrypting, decrypting and setting cryptographic policies concerning short messages transferred between devices;

a message routing service;

a transport service operatively coupled to the message routing service that enables the at least one other disparately-located computing device to exchange short messages with the at least one computer server over the at least one voice and/or computer data network;

a web service application programming interface operatively coupled to the cryptographic services and the transport service that allows for at least one further computer system that is operatively coupled to a computer data network in use by the organization or individual to securely exchange messages between the at least one further computer system and the at least one disparately-located computer system; and an operator/administrative service interface configured for use by an operator, the operator/administrative service interface enabling the operator to securely send and receive short messages;

the operator/administrative service interface being further configured to enable the operator to define and configure policy information for at least one site, group and/or other computing devices that is in communication with the computing server;

the operator/administrative service interface being further configured to enable command and control information to be communicated between the at least one computing server and the at least one other computer device via short messages.

2. The system of claim 1 wherein the system is further configured to provide gateway services for transferring short messages to different network types.

3. The system of claim 1 wherein the system is further configured to provide auditing services for logging short messaging.

4. The system of claim 1 further including a processor configured to check device registration.

5. The system of claim 1 wherein the interface includes selective PIN disablement.

6. The system of claim 1 wherein the interface is configured to manage devices as groups.

7. The system of claim 1 wherein the interface includes at least four of the following commands: select, register, unregister, get status, reset PIN, locate, wipe data, device lock, device unlock, send message, add contact, remove contact, disable PIN and sync.

\* \* \* \* \*